United States Patent
He et al.

(10) Patent No.: US 11,886,894 B2
(45) Date of Patent: Jan. 30, 2024

(54) DISPLAY CONTROL METHOD AND TERMINAL DEVICE FOR DETERMINING A DISPLAY LAYOUT MANNER OF AN APPLICATION

(71) Applicant: HUAWEI TECHNOLOGIES CO., LTD., Guangdong (CN)

(72) Inventors: Liping He, Shanghai (CN); Yueqi Wang, Shanghai (CN); Long Tian, Shanghai (CN); Haowei Liang, Shanghai (CN); Whan Woong Kim Stransom, Shenzhen (CN); Misu Jung, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/783,765

(22) PCT Filed: Nov. 20, 2020

(86) PCT No.: PCT/CN2020/130602
§ 371 (c)(1),
(2) Date: Jun. 9, 2022

(87) PCT Pub. No.: WO2021/115103
PCT Pub. Date: Jun. 17, 2021

(65) Prior Publication Data
US 2023/0027523 A1    Jan. 26, 2023

(30) Foreign Application Priority Data
Dec. 10, 2019    (CN) .......................... 201911256641.2

(51) Int. Cl.
*G06F 9/451*    (2018.01)
*G06F 3/0484*   (2022.01)

(52) U.S. Cl.
CPC ............ *G06F 9/451* (2018.02); *G06F 3/0484* (2013.01); *G06F 2203/04803* (2013.01)

(58) Field of Classification Search
CPC ................... G06F 9/451; G06F 3/0484; G06F 2203/04803
See application file for complete search history.

(56) References Cited

U.S. PATENT DOCUMENTS

| | | | |
|---|---|---|---|
| 2005/0021336 A1* | 1/2005 | Katsuranis | G06F 3/0481 246/251 |
| 2005/0108655 A1* | 5/2005 | Andrea | G06F 9/451 715/788 |

(Continued)

FOREIGN PATENT DOCUMENTS

| | | |
|---|---|---|
| CN | 102830964 A | 12/2012 |
| CN | 105824693 A | 8/2016 |

(Continued)

*Primary Examiner* — Daniel Samwel
(74) *Attorney, Agent, or Firm* — WOMBLE BOND DICKINSON (US) LLP

(57) ABSTRACT

A display control method applied to a terminal device, and includes: determining, in response to a first operation of a user, an application that is running on the terminal device, where the first operation is used to trigger display of an interface of the application that is running on the terminal device; obtaining a display layout manner of the application; and displaying the interface of the application in a display region corresponding to the display layout manner. A display interface of the terminal device includes display regions respectively corresponding to N display layout manners, and N is an integer greater than or equal to 2. Display regions respectively corresponding to a plurality of display layout manners are displayed on the display interface of the terminal device.

20 Claims, 14 Drawing Sheets

(56) References Cited

U.S. PATENT DOCUMENTS

| | | |
|---|---|---|
| 2009/0106674 A1 | 4/2009 | Bray et al. |
| 2013/0263042 A1* | 10/2013 | Buening ............. G06F 3/04883 |
| | | 715/783 |
| 2014/0033037 A1 | 1/2014 | Xu et al. |
| 2014/0033117 A1 | 1/2014 | Kim et al. |
| 2015/0365306 A1* | 12/2015 | Chaudhri .............. H04L 65/403 |
| | | 715/753 |
| 2016/0054867 A1* | 2/2016 | Lee ....................... G06F 3/0482 |
| | | 715/778 |
| 2016/0209987 A1* | 7/2016 | Kaufthal ............... G06F 3/0481 |
| 2016/0239203 A1* | 8/2016 | Sato ................... G06F 3/04883 |
| 2016/0349936 A1* | 12/2016 | Cho ................... G06F 3/04897 |
| 2016/0357404 A1 | 12/2016 | Alonso Ruiz et al. |
| 2017/0024226 A1* | 1/2017 | Yan .......................... G06F 9/451 |
| 2017/0147205 A1 | 5/2017 | Lee et al. |
| 2017/0315708 A1* | 11/2017 | Judd .................... G06F 3/0482 |
| 2017/0322709 A1 | 11/2017 | Chen et al. |
| 2018/0121028 A1* | 5/2018 | Kuscher ............. G06F 3/04845 |
| 2018/0239521 A1* | 8/2018 | Bastide ................ G06F 3/0481 |
| 2018/0356977 A1 | 12/2018 | Won et al. |
| 2019/0107925 A1* | 4/2019 | Cunico ................. G06F 3/0481 |
| 2019/0146625 A1 | 5/2019 | Zhu |
| 2019/0179503 A1 | 6/2019 | Lu et al. |

FOREIGN PATENT DOCUMENTS

| | | |
|---|---|---|
| CN | 105955579 A | 9/2016 |
| CN | 106020592 A | 10/2016 |
| CN | 107783830 A | 3/2018 |
| CN | 108781235 A | 11/2018 |
| CN | 108874288 A | 11/2018 |
| CN | 109388468 A | 2/2019 |
| CN | 109828732 A | 5/2019 |
| CN | 109960446 A | 7/2019 |
| CN | 110020313 A | 7/2019 |
| CN | 110324464 A | 10/2019 |
| CN | 111176764 A | 5/2020 |
| EP | 3518104 A1 | 7/2019 |
| WO | 2016048920 A1 | 3/2016 |

* cited by examiner

DISPLAY CONTROL METHOD AND TERMINAL DEVICE FOR DETERMINING A DISPLAY LAYOUT MANNER OF AN APPLICATION

CROSS-REFERENCE TO RELATED APPLICATIONS

This application is a National Stage of International Patent Application No. PCT/CN2020/130602 filed on Nov. 20, 2020, which claims the priority of Chinese Patent Application No. 201911256641.2 filed on Dec. 10, 2019. Both of the aforementioned applications are hereby incorporated by reference in their entireties.

TECHNICAL FIELD

Embodiments of this application relate to the field of terminal device technologies, and in particular, to a display control method and a terminal device.

BACKGROUND

With popularization and application of an intelligent terminal, a large quantity of computer applications (APP) for resolving life and work problems are developed. An APP runs in hardware and software environments of the intelligent terminal.

A user often triggers viewing of a multi-task interface. The multi-task interface may include a plurality of cards, and the card displays a page that is displayed when an application exits the foreground. The multi-task interface may help the user view all applications running on a terminal device together, and switch between the applications that are running in the foreground. Currently, the cards on the multi-task interface are displayed in two manners. One is an up-down overlapping layout manner. The user may view cards corresponding to different applications by sliding up or down on a display screen of the terminal device. The other is a left-right layout manner. The user may view cards corresponding to different applications by sliding left or right on the display screen of the terminal device.

A current multi-task interface is unfavorable for a user to view an application, and has a poor display effect.

SUMMARY

Embodiments of this application provide a display control method and a terminal device, to improve a display effect of displaying a running application on the terminal device.

According to a first aspect, an embodiment of this application provides a display control method, applied to a terminal device, where the display control method includes: determining, in response to a first operation of a user, an application that is running on the terminal device, where the first operation is used to trigger display of an interface of the application that is running on the terminal device; obtaining a display layout manner of the application; and displaying the interface of the application in a display region corresponding to the display layout manner. A display interface of the terminal device includes display regions respectively corresponding to N display layout manners, and N is an integer greater than or equal to 2.

According to the display control method provided in the first aspect, after the user triggers the terminal device to display a running application, the display interface of the terminal device may display display regions respectively corresponding to a plurality of display layout manners, and may display interfaces of at least two running applications, to improve a display effect of a multi-task interface, facilitate the user to switch between applications that are running in the foreground, and improve user experience.

In an embodiment of the first aspect, the method further includes: obtaining related information of the application; and the obtaining a display layout manner of the application includes: obtaining the display layout manner of the application based on the related information of the application.

In an embodiment of the first aspect, the related information of the application includes one or more of the following: a name of the application, display content or display indication information that is of the application, where the display indication information is used to indicate the display layout manner of the application.

In an embodiment of the first aspect, the display layout manner of the application is related to a display ratio of the display content of the application. The display ratio of the display content is a proportion of the display content to the interface of the application when the interface of the application is displayed in full screen on the display interface of the terminal device.

In an embodiment of the first aspect, if the display ratio of the display content of the application is greater than a preset proportion, the display layout manner of the application is a display layout manner that has a largest display region.

In an embodiment of the first aspect, the display layout manner of the application is related to a data volume of key information in the display content of the application.

In an embodiment of the first aspect, the displaying the interface of the application in a display region corresponding to the display layout manner includes: displaying, in the display region corresponding to the display layout manner, the key information in the display content of the application.

In an embodiment of the first aspect, the display content of the application includes privacy information, and the displaying the interface of the application in a display region corresponding to the display layout manner includes: fuzzily displaying the interface of the application in the display region corresponding to the display layout manner.

In an embodiment of the first aspect, the displaying the interface of the application in a display region corresponding to the display layout manner includes: displaying the interface of the application and an operation control of the application in the display region corresponding to the display layout manner.

In an embodiment of the first aspect, the method further includes: displaying, in response to an operation of the user on the operation control, a running interface of the application in full screen on the display interface of the terminal device, where the running interface is an interface displayed when the application executes a task corresponding to the operation control.

In an embodiment of the first aspect, the related information of the application includes information about the operation control.

According to a second aspect, an embodiment of this application provides a terminal device, including: a determining module, configured to determine, in response to a first operation of a user, an application that is running on the terminal device, where the first operation is used to trigger display of an interface of the application that is running on the terminal device; an obtaining module, configured to obtain a display layout manner of the application; and a display module, configured to display the interface of the application in a display region corresponding to the display layout manner. A display interface of the terminal device includes display regions respectively corresponding to N display layout manners, and N is an integer greater than or equal to 2.

In an embodiment of the second aspect, the obtaining module is further configured to obtain related information of the application. The obtaining module is configured to obtain the display layout manner of the application based on the related information of the application.

In an embodiment of the second aspect, the related information of the application includes one or more of the following: a name of the application, display content or display indication information that is of the application, where the display indication information is used to indicate the display layout manner of the application.

In an embodiment of the second aspect, the display layout manner of the application is related to a display ratio of the display content of the application. The display ratio of the display content is a proportion of the display content to the interface of the application when the interface of the application is displayed in full screen on the display interface of the terminal device.

In an embodiment of the second aspect, if the display ratio of the display content of the application is greater than a preset proportion, the display layout manner of the application is a display layout manner that has a largest display region.

In an embodiment of the second aspect, the display layout manner of the application is related to a data volume of key information in the display content of the application.

In an embodiment of the second aspect, the display module is configured to display, in the display region corresponding to the display layout manner, the key information in the display content of the application.

In an embodiment of the second aspect, the display content of the application includes privacy information, and the display module is configured to fuzzily display the interface of the application in the display region corresponding to the display layout manner.

In an embodiment of the second aspect, the display module is configured to display the interface of the application and an operation control of the application in the display region corresponding to the display layout manner.

In an embodiment of the second aspect, the display module is further configured to display, in response to an operation of the user on the operation control, a running interface of the application in full screen on the display interface of the terminal device, where the running interface is an interface displayed when the application executes a task corresponding to the operation control.

In an embodiment of the second aspect, the related information of the application includes information about the operation control.

According to a third aspect, an embodiment of this application provides a terminal device, including a processor, a memory, and a computer program that is stored in the memory and that is capable of being run on the processor, where the processor executes the computer program, so that the terminal device performs the method provided in the first aspect.

According to a fourth aspect, an embodiment of this application provides a computer-readable storage medium, where the computer-readable storage medium stores instructions, and when the instructions are run on a computer or a processor, the method provided in the first aspect is implemented.

According to a fifth aspect, an embodiment of this application provides a program product, where the program product includes a computer program, the computer program is stored in a readable storage medium, at least one processor of a terminal device may read the computer program from the readable storage medium, and the at least one processor executes the computer program so that the terminal device implements the method provided in the first aspect.

In the foregoing aspects, in an embodiment, areas of display regions respectively corresponding to at least two display layout manners in the N display layout manners are different.

DESCRIPTION OF EMBODIMENTS

The following describes embodiments of this application with reference to the accompanying drawings.

A display control method provided in embodiments of this application may be applied to a terminal device, and relates to the field of artificial intelligence technologies. First, concepts in embodiments of this application are described.

1. A Multi-Task Interface

A plurality of applications (APP) may be installed on a terminal device. An application depends on hardware resources and software resources of the terminal device for running. The plurality of applications may run simultaneously on the terminal device. A user may trigger the terminal device to display the multi-task interface. The multi-task interface may help the user view the plurality of applications that are running on the terminal device together, and switch an application that is running in the foreground.

A name of the multi-task interface is not limited in embodiments of this application. In embodiments of this application, the multi-task interface may be referred to as a display interface of the terminal device.

2. An Application Running in the Foreground

When the application runs in the foreground, the terminal device may display a running interface of the application.

3. An Application Running in the Background

When the application runs in the background, the application still runs on the terminal device, but a running interface of the application is not displayed on the terminal device.

The following describes an existing multi-task interface.

Figure 1:
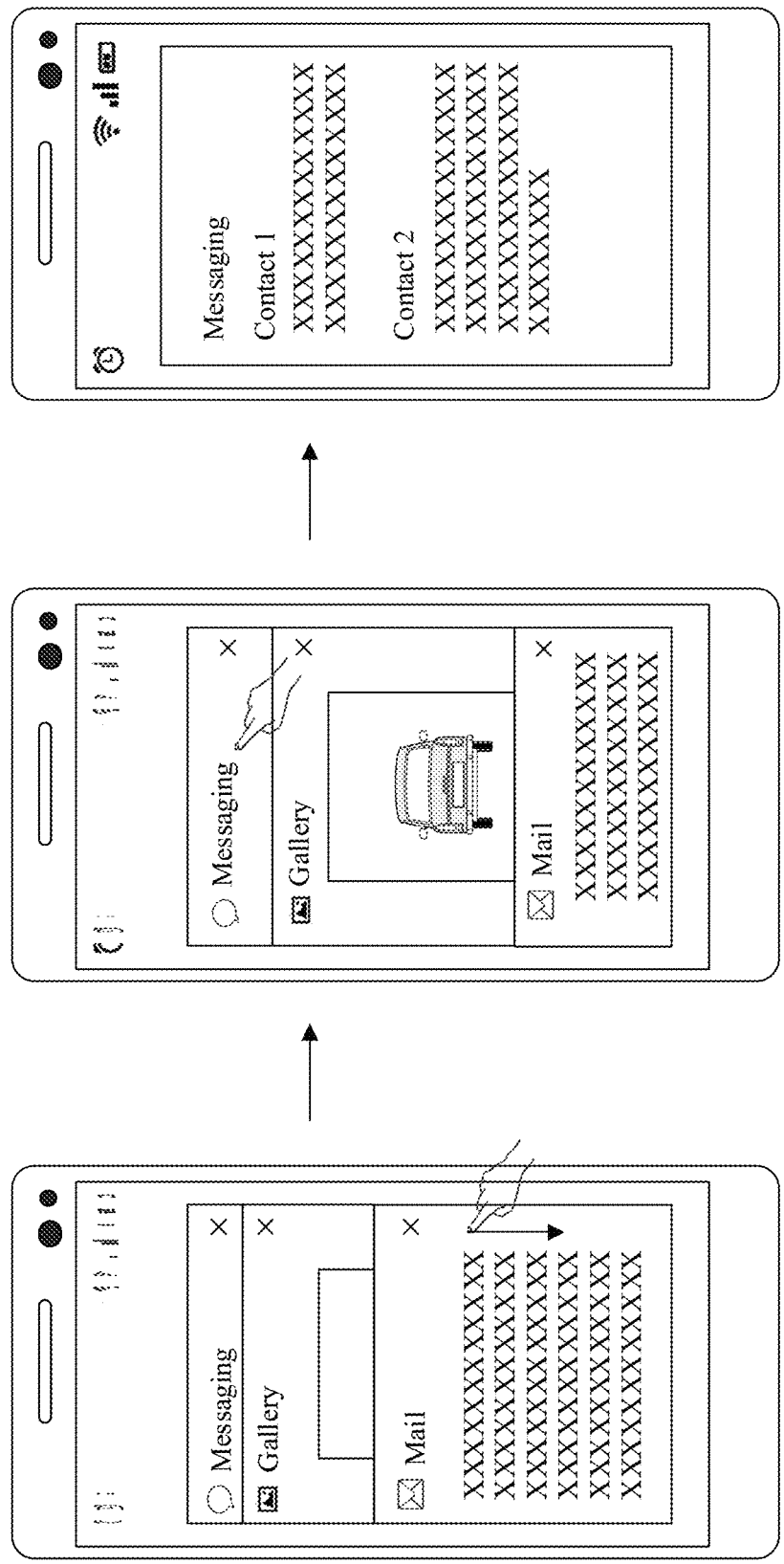
FIG. 1 is a schematic diagram of an existing multi-task interface.

For example, in an embodiment, reference is made to FIG. 1. FIG. 1 is a schematic diagram of an existing multi-task interface. As shown on the left side in FIG. 1, three applications are running on a terminal device, and names of the applications are respectively Mail, Gallery, and Messaging. In an embodiment, the multi-task interface includes three cards that are arranged in an up-down overlapping layout. Each card corresponds to one running application, and displays a page presented when the application exits the foreground. A user may view cards corresponding to different applications by sliding up or down on a display screen of the terminal device. For example, when the user slides downward on the display screen of the terminal device, the multi-task interface changes from the left side in FIG. 1 to the middle shown in FIG. 1. A card corresponding to the application "Mail" becomes smaller, and cards corresponding to the application "Gallery" and the application "Messaging" become larger, so that it is convenient for the user to view pages presented when the application "Gallery" and the application "Messaging" exit the foreground. When the user taps any location on the card corresponding to the application "Messaging", the terminal device stops displaying the multi-task interface, and switches the application running in the foreground to the application "Messaging". In addition, the terminal device displays a running interface of the application "Messaging", as shown on the right side in FIG. 1.

Figure 2:
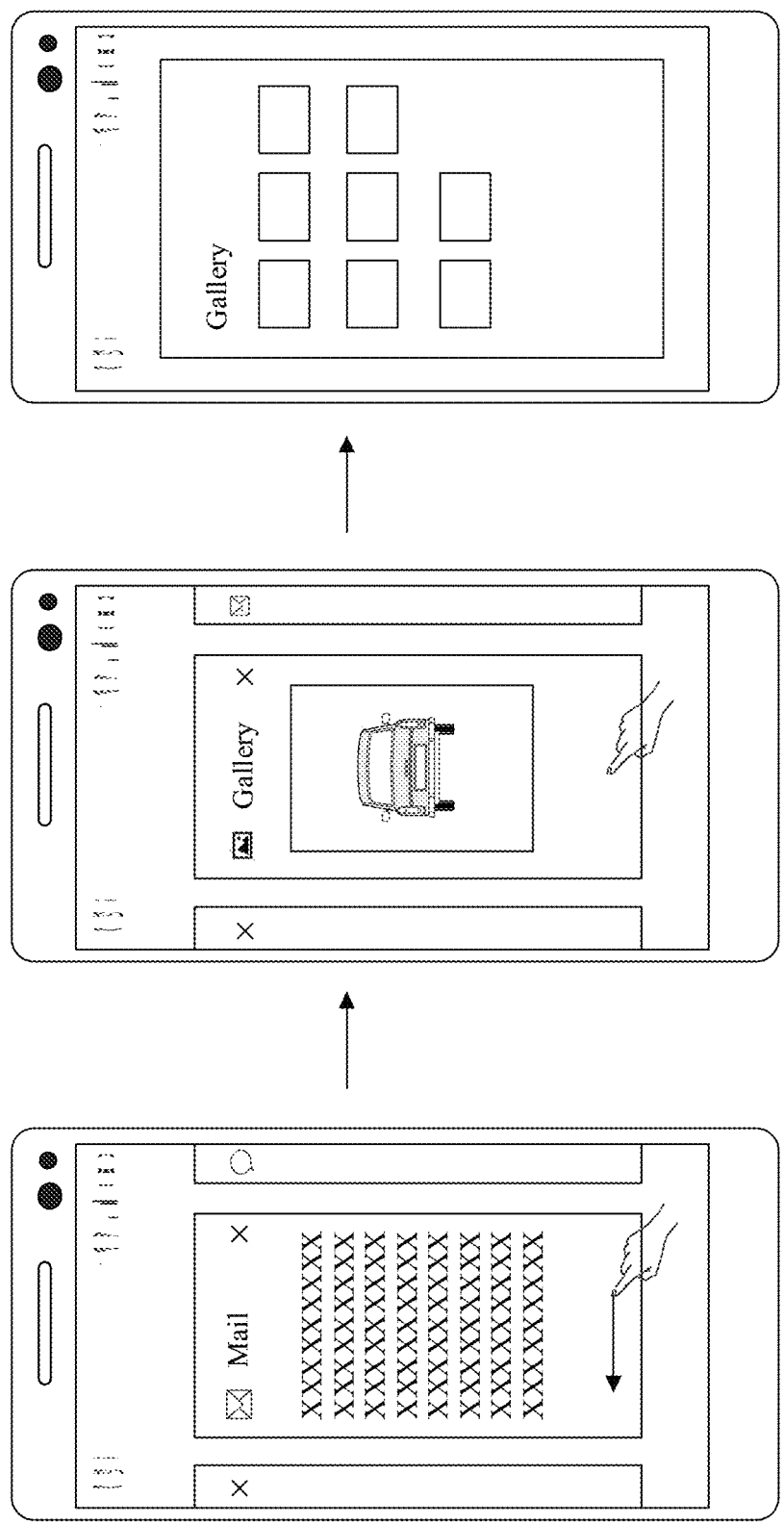
FIG. 2 is another schematic diagram of an existing multi-task interface.

For example, reference is made to FIG. 2. FIG. 2 is another schematic diagram of an existing multi-task interface. Three applications are running on a terminal device, and names of the applications are respectively Mail, Gallery, and Messaging. In an embodiment, the multi-task interface includes three cards that are arranged in a left-right layout. Each card corresponds to one running application, and displays a page presented when the application exits the foreground. Because the cards are arranged in a left-right layout, the terminal device can display only one card at a time, as shown on the left side in FIG. 2. A user may view cards corresponding to different applications by sliding left or right on a display screen of the terminal device. For example, when the user slides leftward on the display screen of the terminal device, the multi-task interface changes from the left side in FIG. 2 to the middle shown in FIG. 2, and the terminal device displays the card corresponding to the application "Gallery". When the user taps any location on the card corresponding to the application "Gallery", the terminal device stops displaying the multi-task interface, and switches the application running in the foreground to the application "Gallery". In addition, the terminal device displays a running interface of the application "Gallery", as shown on the right side in FIG. 2.

In an embodiment, the multi-task interface displays, in a manner of top-down overlapping display or left-right display, a plurality of applications that are running on a terminal device. The user needs to perform operations to view running statuses of different applications and switch between applications that are running in the foreground. Therefore, a display effect of the multi-task interface is poor, user operations are complex, and user experience is poor.

To resolve the foregoing technical problem, embodiments of this application provide a display control method and a terminal device. After a user triggers a terminal device to display an interface of a running application, a display interface of the terminal device may display display regions respectively corresponding to a plurality of display layout manners, and may display interfaces of at least two running applications, to improve a display effect of a multi-task interface, facilitate the user to switch between applications that are running in the foreground, and improve user experience.

It should be noted that a type and a name that are of the terminal device are not limited in embodiments of this application. Examples of some terminal devices are a mobile phone (mobile phone), a tablet computer, a notebook computer, a palmtop computer, a mobile internet device (MID), a wearable device, a virtual reality (VR) device, an augmented reality (AR) device, a terminal in industrial control, a terminal in self-driving, a terminal in smart driving, a terminal in a remote medical surgery, a terminal in a smart grid, a terminal in transportation safety, a terminal in a smart city, a terminal in a smart home, or the like.

The following describes in detail, by using embodiments, the technical solutions of this application and how to resolve the foregoing technical problems by using the technical solutions of this application. The following embodiments may be combined with each other, and same or similar concepts or processes may not be described in detail in some embodiments.

It should be noted that in embodiments of this application, "at least one" may be further described as one or more, and "a plurality of" may be two, three, four, or more. This is not limited in embodiments of this application.

Figure 3:
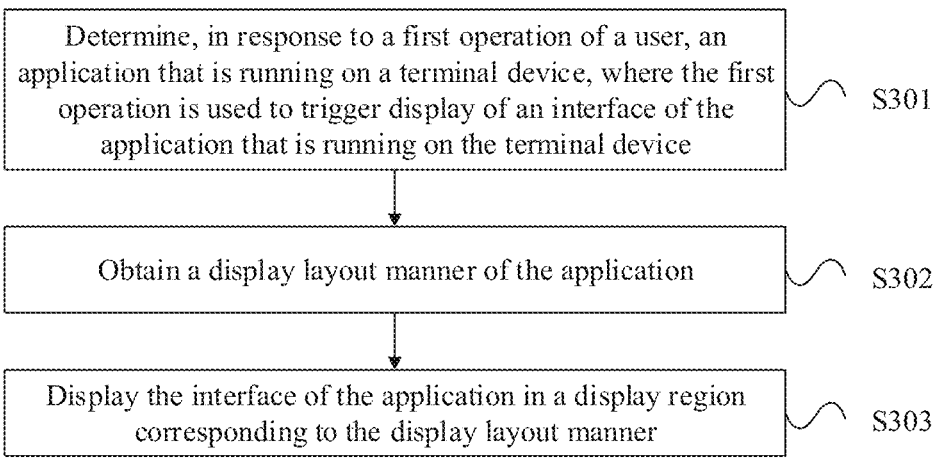
FIG. 3 is a flowchart of a display control method according to an embodiment of this application.

FIG. 3 is a flowchart of a display control method according to an embodiment of this application. The display control method provided in an embodiment of the application may be applied to a terminal device. As shown in FIG. 3, the display control method provided in an embodiment may include the following operations.

S301: Determine, in response to a first operation of a user, an application that is running on the terminal device, where the first operation is used to trigger display of an interface of the application that is running on the terminal device.

The first operation is not limited in an embodiment of the application. In an embodiment, the first operation may be a user-defined gesture operation, and the gesture operation may include but is not limited to tapping, double-tapping, sliding, zooming in, zooming out, or a combination of at least one thereof. For example, the first operation may be that the user double taps a screen and then slides to the right. In this process, a finger of the user is always in contact with the touchscreen of the terminal device. In an embodiment, the first operation may be an operation defined by the terminal device. In an embodiment, the operation defined by the terminal device may include but is not limited to tapping, double-tapping, sliding, zooming in, zooming out, or a combination of at least one thereof. In an embodiment, a menu button may be set on the terminal device, and the first operation may be an operation performed by the user on the menu button. In an embodiment, the menu button may be a virtual button displayed on the terminal device or an entity button on the terminal device. In an embodiment, the first operation may be that the user inputs a voice to the terminal device by using a microphone of the terminal device. For example, the user says "Show a multi-task interface" or "Hi, I want to see what applications are running on my phone". Correspondingly, the terminal device may receive the voice message input by the user, and obtain an instruction according to the voice message, where the instruction is used to instruct to display the interface of the application that is running on the terminal device. In an embodiment, the terminal device may obtain the instruction based on the voice message and by using an artificial intelligence (AI) algorithm such as speech recognition or semantic recognition.

S302: Obtain a display layout manner of the application.

For example, in an embodiment, a plurality of display layout manners are included. Different display layout manners correspond to different manners for displaying application interfaces.

In an embodiment, different manners for displaying the application interfaces may mean that areas of the displayed application interfaces are different.

In an embodiment, different manners for displaying the application interfaces may further means that at least one of the following elements is different: a display color, a display template style, or whether fuzzy display is applied.

S303: Display the interface of the application in a display region corresponding to the display layout manner.

In this operation, a display interface of the terminal device includes display regions respectively corresponding to N display layout manners, and N is an integer greater than or equal to 2.

For example, the display interface of the terminal device includes display regions respectively corresponding to at least two display layout manners. In an embodiment, the display interface of the terminal device includes at least two display regions, each display region may display an interface of one application that is running on the terminal device, and the display interface of the terminal device may simultaneously display interfaces of a plurality of running applications.

It may be learned that, according to the display control method provided in an embodiment, after the user triggers the terminal device to display the interface of the running application, the display interface of the terminal device may display display regions respectively corresponding to a plurality of display layout manners, and may display interfaces of at least two running applications. Compared with the existing multi-task interface display manner, the method in an embodiment increases a quantity of displayed application interfaces, improves a display effect of the multi-task interface, facilitates the user to view a running application and switch between applications that are running in the foreground, and improves user experience.

It should be noted that a quantity of display regions that correspond to each display layout manner and that are on the display interface of the terminal device is not limited in an embodiment. For example, the display interface of the terminal device includes display regions respectively corresponding to three display layout manners. A display layout manner 1 corresponds to two display regions, a display layout manner 2 corresponds to four display regions, and a display layout manner 3 corresponds to one display region. In this case, the display interface of the terminal device includes a total of seven display regions, and interfaces of a maximum of seven running applications may be simultaneously displayed.

It should be noted that a value of N is not limited in an embodiment.

In an embodiment, areas of display regions respectively corresponding to at least two display layout manners in the N display layout manners are different.

Figure 4:
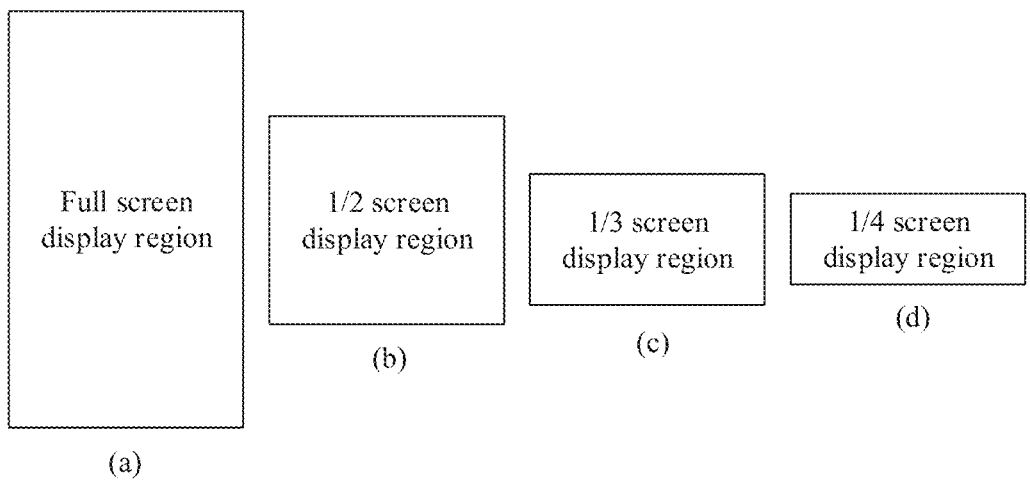
FIG. 4 is a schematic diagram of display regions corresponding to display layout manners according to an embodiment of this application.

The following describes, by using an example shown in FIG. 4, a display region corresponding to a display layout manner, but does not constitute a limitation on this application.

FIG. 4 is a schematic diagram of display regions corresponding to display layout manners according to an embodiment of this application. FIG. 4(a) shows a display area obtained when a display interface of a terminal device is displayed in full screen. FIG. 4(b) to FIG. 4(d) show areas of display regions respectively corresponding to three display layout manners. An area of a display region shown in FIG. 4(b) is a ½ screen, an area of a display region shown in FIG. 4(c) is a ⅓ screen, and an area of a display region shown in FIG. 4(d) is a ¼ screen.

It should be noted that an area of a display region corresponding to each display layout manner is not limited in an embodiment.

Figure 5:
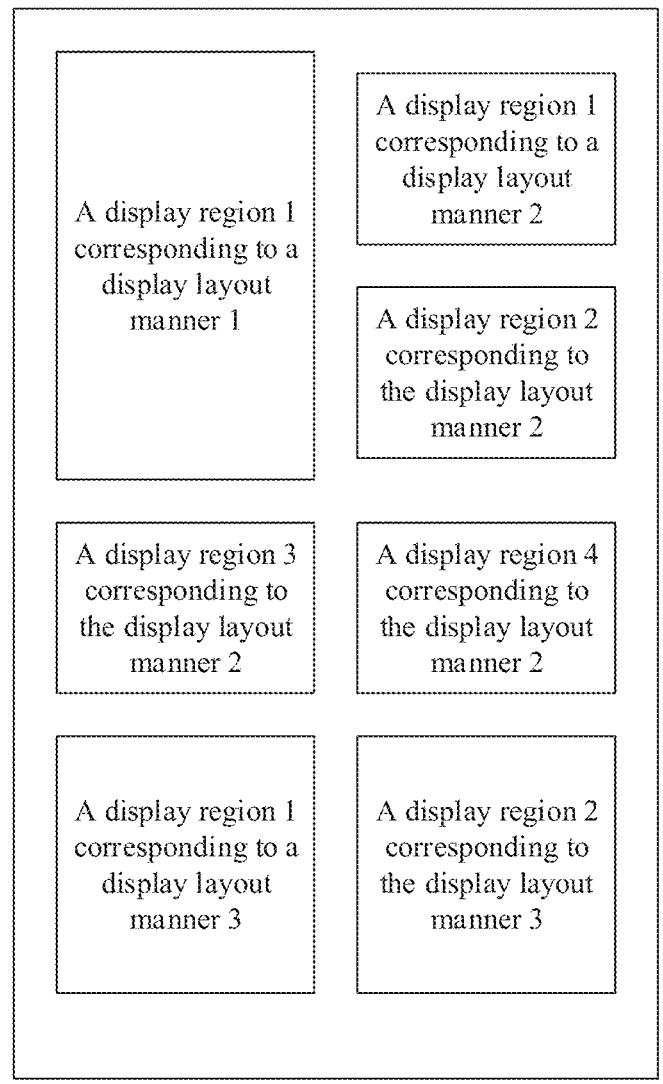
FIG. 5 is a schematic diagram of a display interface of a terminal device according to an embodiment of this application.
Figure 6:
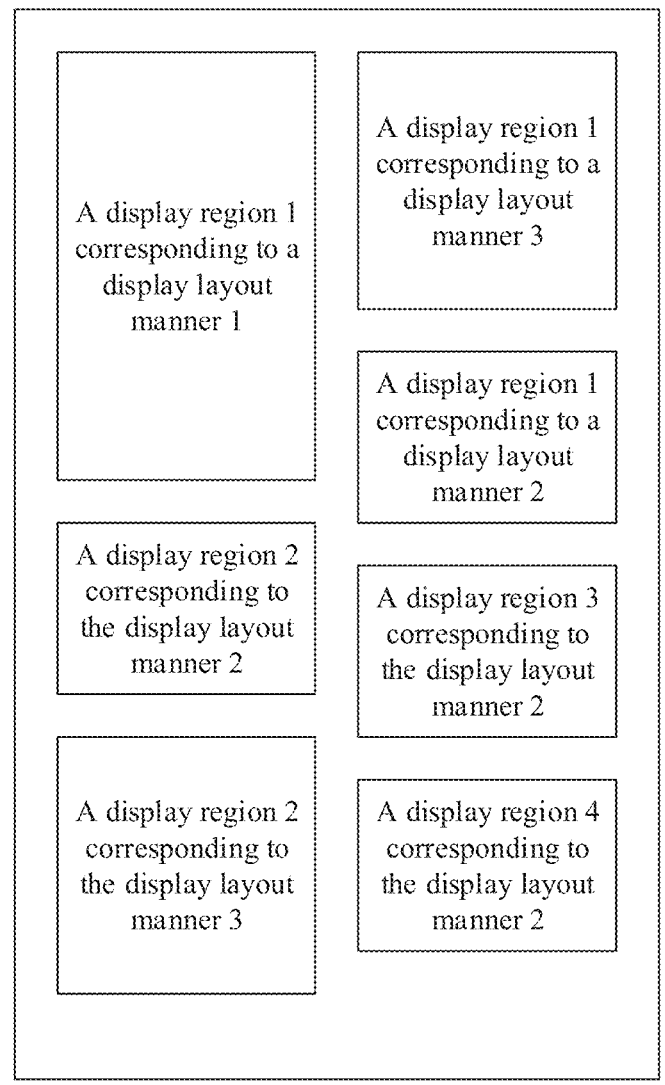
FIG. 6 is another schematic diagram of a display interface of a terminal device according to an embodiment of this application.
Figure 7:
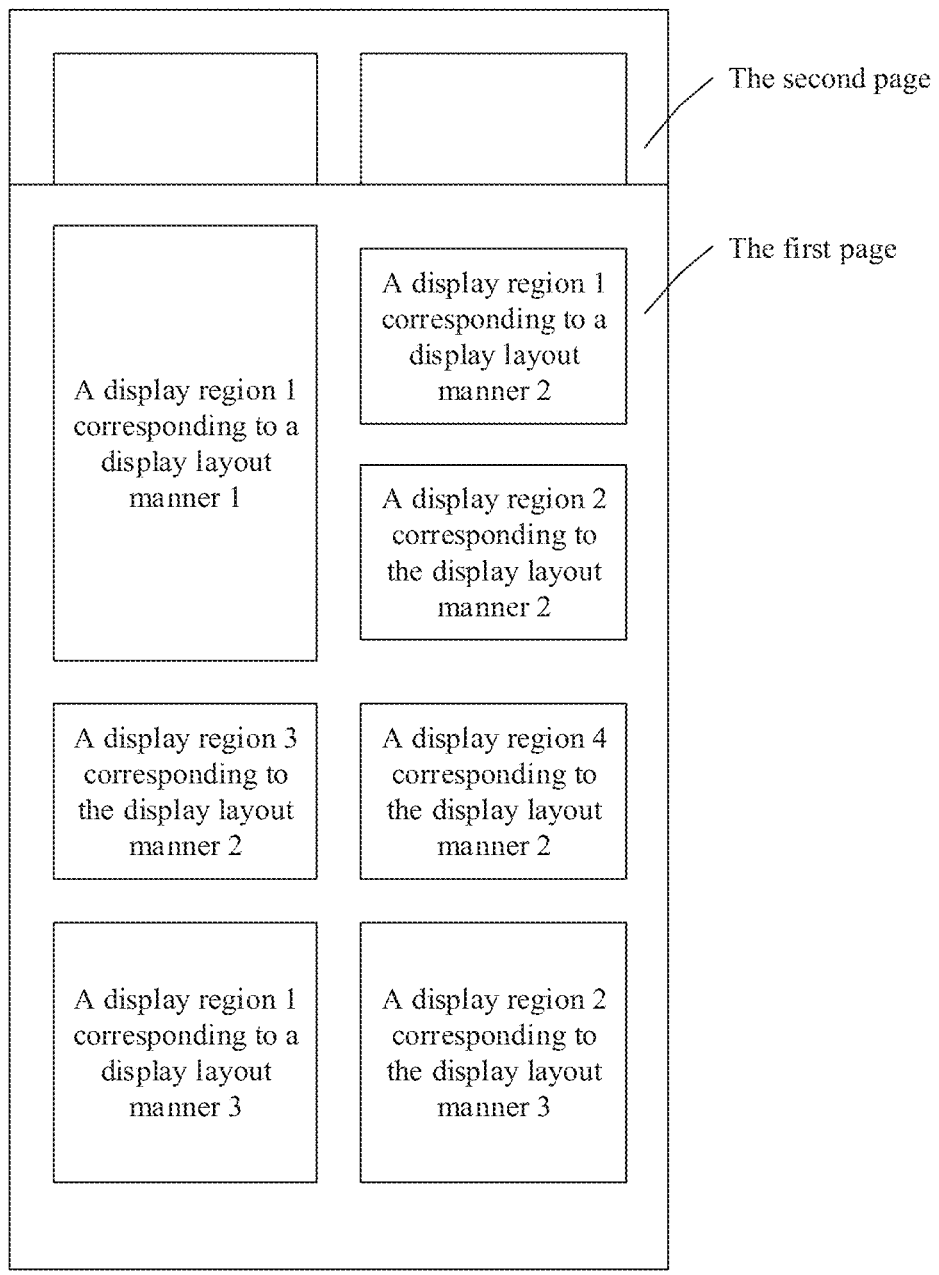
FIG. 7 is still another schematic diagram of a display interface of a terminal device according to an embodiment of this application.
Figure 8:
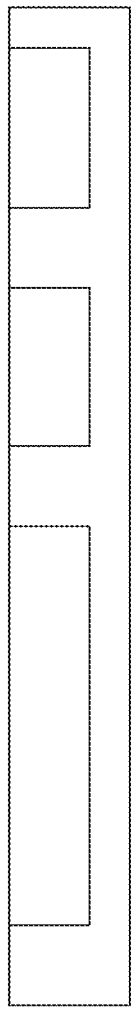
FIG. 8 is still another schematic diagram of a display interface of a terminal device according to an embodiment of this application.
Figure 8:
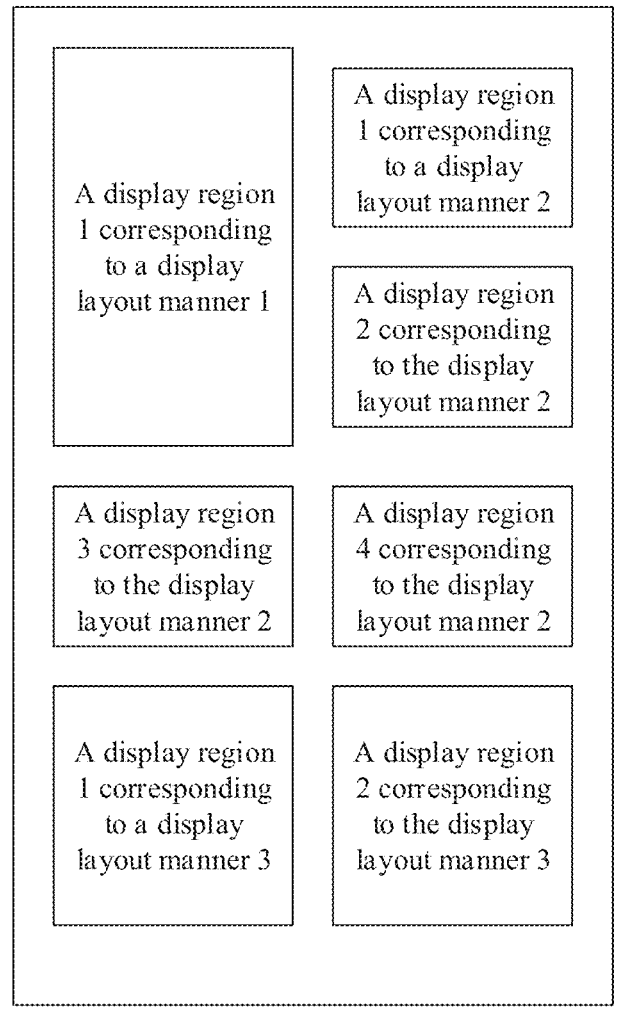
Figure 8:
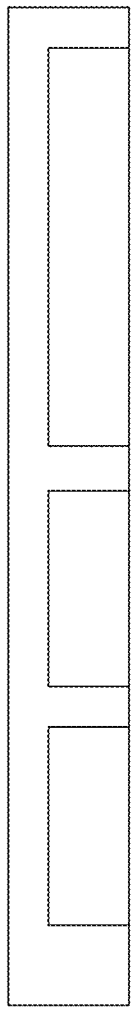

The following describes, by using an example shown in FIG. 5 to FIG. 8, a display interface of a terminal device, but does not constitute a limitation on this application. FIG. 5 and FIG. 6 have similar application scenarios, and may be applied to a scenario in which a quantity of applications that are running on a terminal device is small and the applications can be completely displayed on one page. FIG. 7 and FIG. 8 have similar application scenarios, and may be applied to a scenario in which a plurality of pages are used to completely display applications that are running on the terminal device. For example, if a quantity of applications that are running on the terminal device is large, or for a display region corresponding to a display layout manner of an application, no idle display region exists on the first page of the display interface of the terminal device, an interface of the application can only be displayed on another page of the display interface of the terminal device.

FIG. 5 is a schematic diagram of a display interface of a terminal device according to an embodiment of this application. As shown in FIG. 5, the display interface of the terminal device includes display regions corresponding to three display layout manners. A display layout manner 1 corresponds to one display region, and the display region is located in an upper left corner of the display interface of the terminal device. A display layout manner 2 corresponds to four display regions, and the four display regions are marked as display regions 1 to 4 corresponding to the display layout manner 2. The four display regions are located in a right upper part and a middle part of the display interface of the terminal device. A display layout manner 3 corresponds to two display regions, and the two display regions are marked as display regions 1 and 2 corresponding to the display layout manner 3. The two display regions are located in a lower part of the display interface of the terminal device. The display interface of the terminal device includes a total of seven display regions, and may simultaneously display interfaces of a maximum of seven running applications.

FIG. 6 is another schematic diagram of a display interface of a terminal device according to an embodiment of this application. As shown in FIG. 6, the display interface of the terminal device includes display regions corresponding to three display layout manners. A display layout manner 1 corresponds to one display region, and the display region is located in an upper left corner of the display interface of the terminal device. A display layout manner 2 corresponds to four display regions, and the four display regions are marked as display regions 1 to 4 corresponding to the display layout manner 2. The four display regions are located in a middle left side and a right middle lower part of the display interface of the terminal device. A display layout manner 3 corresponds to two display regions, and the two display regions are marked as display regions 1 and 2 corresponding to the display layout manner 3. The two display regions are respectively located in a lower left corner and an upper right corner of the display interface of the terminal device. The display interface of the terminal device includes a total of seven display regions, and may simultaneously display interfaces of a maximum of seven running applications.

FIG. 7 is still another schematic diagram of a display interface of a terminal device according to an embodiment of this application. As shown in FIG. 7, the display interface of the terminal device includes two pages, and the two pages are arranged in an up-down overlapping layout. For a related principle, refer to a principle of an up-down overlapping layout of a plurality of cards in FIG. 1. A difference lies in that each page in FIG. 7 may include a plurality of display regions. For example, for the first page in FIG. 7, refer to related descriptions in FIG. 5.

FIG. 8 is still another schematic diagram of a display interface of a terminal device according to an embodiment of this application. As shown in FIG. 8, the display interface of the terminal device includes three pages, and the three pages are displayed in a left-right layout manner. For a related principle, refer to a principle of a left-right layout of a plurality of cards in FIG. 2. A difference lies in that each page in FIG. 8 may include a plurality of display regions. For example, for the first page in FIG. 8, refer to related descriptions in FIG. 6.

It should be noted that, in the application scenario in FIG. 5 or FIG. 6, a quantity of display regions included in the display interface of the terminal device and a position of the display region are not limited in an embodiment. In the application scenario in FIG. 7 or FIG. 8, a quantity of pages included in the display interface of the terminal device is not limited in an embodiment.

In an embodiment, the terminal device may prestore a plurality of templates of display interfaces.

In an embodiment, the display control method provided in an embodiment may further include:
obtaining related information of the application.
Correspondingly, in S302, the obtaining a display layout manner of the application may include:

obtaining the display layout manner of the application based on the related information of the application.

The display layout manner of the application is determined by using the related information of the application. This improves accuracy of determining the display layout manner of the application.

In an embodiment, the related information of the application may include one or more of the following: a name of the application, display content or display indication information that is of the application. The display indication information is used to indicate the display layout manner of the application.

In an embodiment, the display indication information may explicitly indicate the display layout manner of the application. For example, display layout manners of applications include display layout manners 1 to 5. In related information of an application 1, display indication information may be the display layout manner 2, and the display indication information clearly and explicitly indicates that a display layout manner of the application 1 is the display layout manner 2.

In an embodiment, the terminal device may determine the display layout manner of the application based on the display indication information. For example, the display indication information includes a display ratio of the display content, and the terminal device may determine the display layout manner of the application based on the display ratio of the display content. For details, refer to descriptions in the following embodiment.

It should be noted that the name of the application, the display content of the application, and content included in the display indication information are not limited in an embodiment.

An embodiment provides a display control method, including: determining, in response to the first operation of the user, the application that is running on the terminal device, obtaining the display layout manner of the application, and displaying the interface of the application in the display region corresponding to the display layout manner. Because the display interface of the terminal device may display interfaces of at least two running applications, a quantity of displayed application interfaces is increased, so that a display effect is improved, it is convenient for the user to view a running application and switch between applications that are running in the foreground, and user experience is improved.

In an embodiment, the display layout manner of the application is related to a display ratio of display content of the application.

The display ratio of the display content is a proportion of the display content to the interface of the application when the interface of the application is displayed in full screen on the display interface of the terminal device.

An example is used for description.

Figure 9:
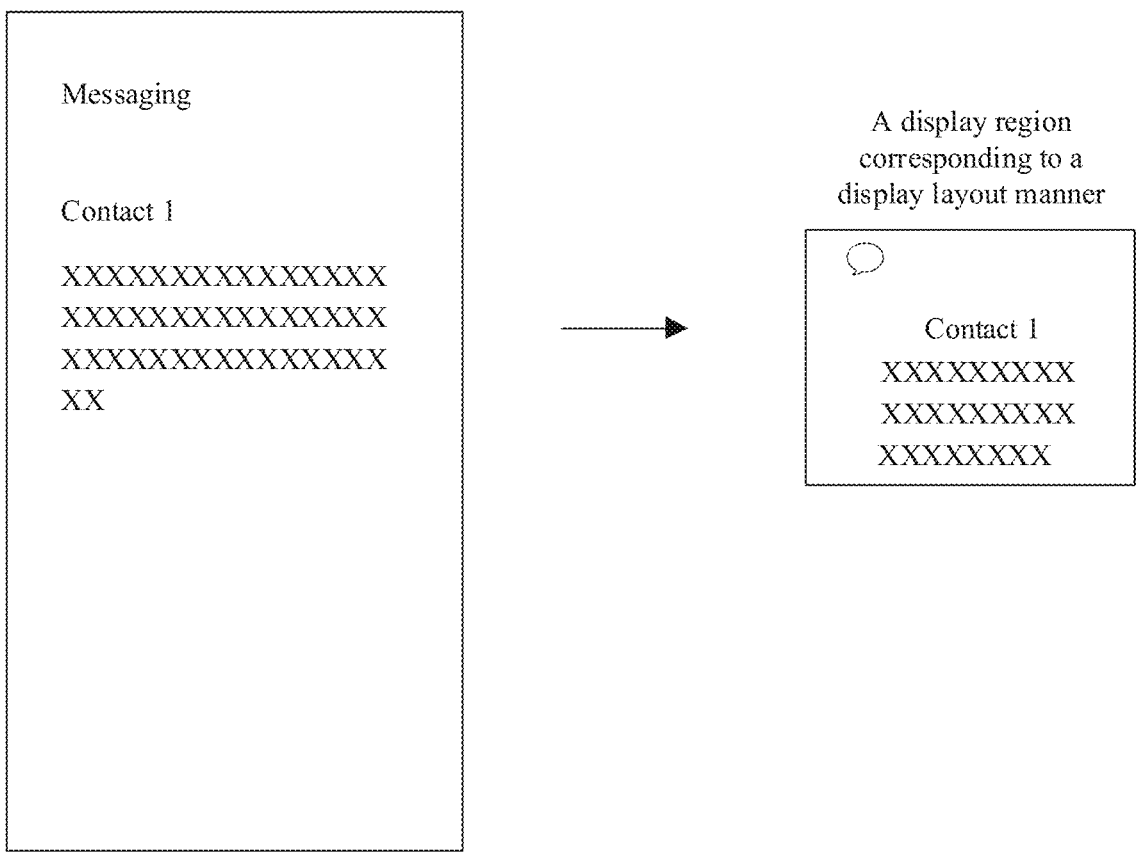
FIG. 9 is another schematic diagram of a display region corresponding to a display layout manner according to an embodiment of this application.

FIG. 9 is another schematic diagram of a display region corresponding to a display layout manner according to an embodiment of this application. As shown on the left side in FIG. 9, an interface of an application "Messaging" includes little display content. It is assumed that a proportion of the display content to the interface of the application is 30% when the interface of the application "Messaging" is displayed in full screen on the display interface of the terminal device. In this case, an area of a display region corresponding to a display layout manner of the application "Messaging" may be a display region that has a small area. For example, the display layout manner of the application "Messaging" may be the display layout manner 2 or the display layout manner 3 that is shown in FIG. 5.

Figure 10:
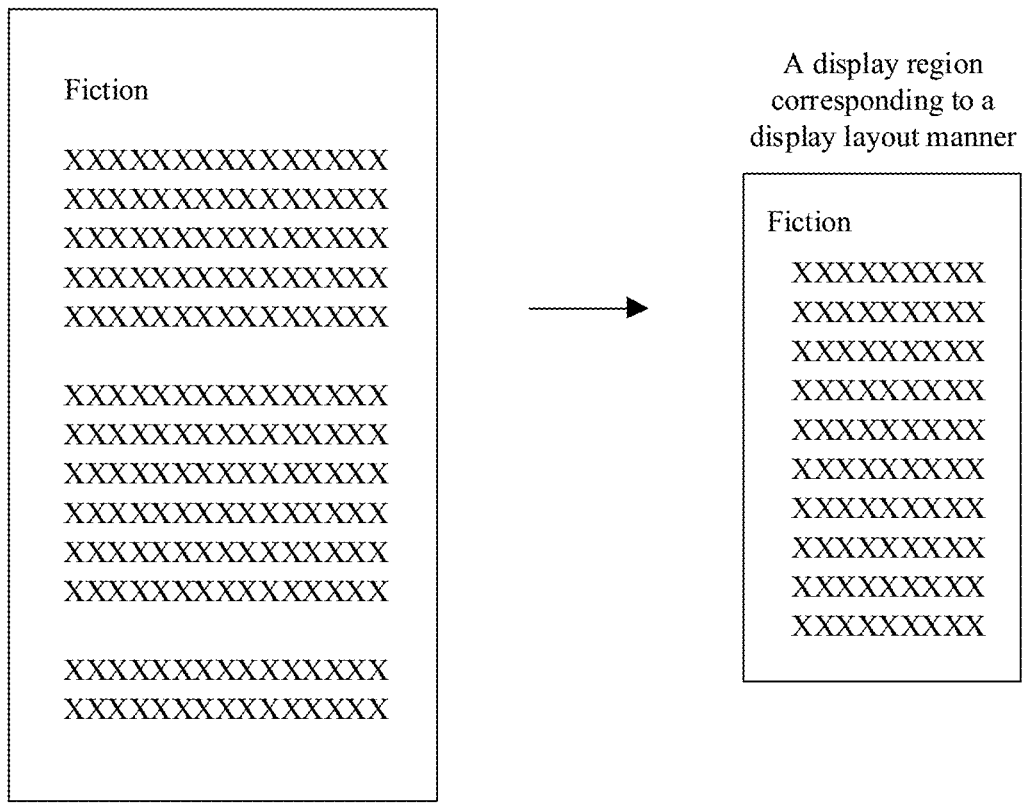
FIG. 10 is still another schematic diagram of a display region corresponding to a display layout manner according to an embodiment of this application.

FIG. 10 is still another schematic diagram of a display region corresponding to a display layout manner according to an embodiment of this application. As shown on the left side in FIG. 10, an interface of an application "Fiction" includes much display content. It is assumed that a proportion of the display content to the interface of the application is 90% when the interface of the application "Fiction" is displayed in full screen on the display interface of the terminal device. In this case, an area of a display region corresponding to a display layout manner of the application "Fiction" may be a display region that has a large area. For example, the display layout manner of the application "Fiction" may be the display layout manner 1 or the display layout manner 3 that is shown in FIG. 5.

In an embodiment, if the display ratio of the display content of the application is greater than a preset proportion, the display layout manner of the application is a display layout manner that has a largest display region.

A value of the preset proportion is not limited in an embodiment, and may be, for example, 50%.

For example, with reference to FIG. 10 and FIG. 5, the display layout manner of the application "Fiction" in FIG. 10 may be the display layout manner 1 shown in FIG. 5.

A display layout of an application is determined by using a display ratio of display content of the application. A display layout of an application with a large display ratio corresponds to a display region that has a large area, and a display layout of an application with a small display ratio corresponds to a display region that has a small area, so that a user can intuitively view a running application, a display effect of a multi-task interface is improved, and user experience is improved.

In an embodiment, the display layout manner of the application is related to a data volume of key information in the display content of the application.

Generally, key information in display content of an application is displayed on an interface of the application as much as possible. If a data volume of the key information is small, the interface of the application requires a small area, a display layout of the application corresponds to a display region that has a small area. If a data volume of the key information is large, the interface of the application requires a large area, a display layout of the application corresponds to a display region that has a large area. A display layout of an application is determined by using a data volume of key information in display content of the application, so that a display effect of a multi-task interface is improved and user experience is improved.

Content included in the key information is not limited in an embodiment, and may vary based on different applications.

In an embodiment, in S303, the displaying the interface of the application in a display region corresponding to the display layout manner may include:

displaying, in the display region corresponding to the display layout manner, the key information in the display content of the application.

In an embodiment, the display content of the application may include privacy information. Content included in the privacy information is not limited in an embodiment. For example, the privacy information includes but is not limited to at least one of the following: a user ID card number, a user name and a password that are used by the user to log in to an application, a bank card number, a bank card balance, a payment quick response code, a mobile phone number of the user, and an address of the user.

In S303, the displaying the interface of the application in a display region corresponding to the display layout manner may include:

fuzzily displaying the interface of the application in the display region corresponding to the display layout manner.

An interface of an application is fuzzily displayed, so that information confidentiality and information security are improved, and a display effect and user experience are improved.

In an embodiment, in S303, the displaying the interface of the application in a display region corresponding to the display layout manner may include:

displaying the interface of the application and an operation control of the application in the display region corresponding to the display layout manner.

The operation control is used to provide a shortcut operation entry for quickly switching between applications that are running in the foreground and executing a task corresponding to the operation control.

An example is used for description.

Figure 11:
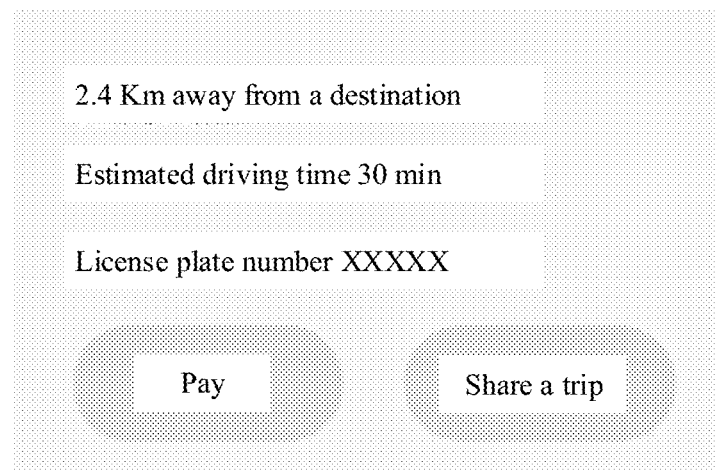
FIG. 11 is still another schematic diagram of a display region corresponding to a display layout manner according to an embodiment of this application.

FIG. 11 is still another schematic diagram of a display region corresponding to a display layout manner according to an embodiment of this application. FIG. 11 shows an application used for traveling. In this example, an operation control of the application includes two touch buttons: a touch button "pay" and a touch button "share a trip". The touch button "pay" provides a shortcut operation entry for quickly switching the trip application to the foreground for running and directly performing a payment operation. The touch button "share a trip" provides a shortcut operation entry for quickly switching the trip application to the foreground for running and directly performing a trip sharing operation.

Figure 12:
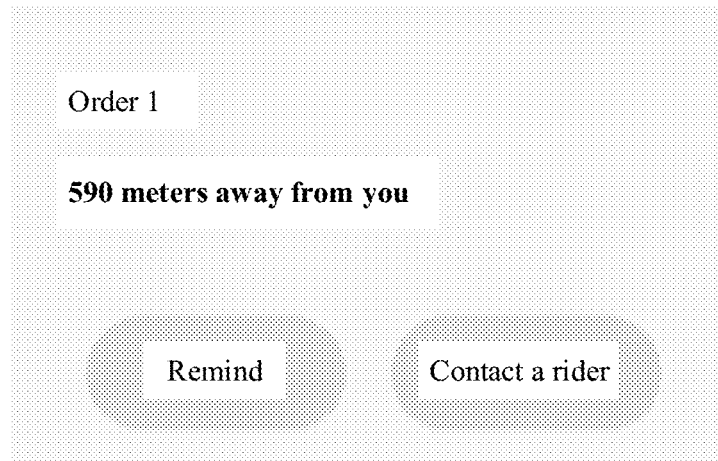
FIG. 12 is still another schematic diagram of a display region corresponding to a display layout manner according to an embodiment of this application.

FIG. 12 is still another schematic diagram of a display region corresponding to a display layout manner according to an embodiment of this application. FIG. 12 shows an application used for meal ordering. In this example, an operation control of the application includes two touch buttons: a touch button "remind" and a touch button "contact a rider".

Figure 13:
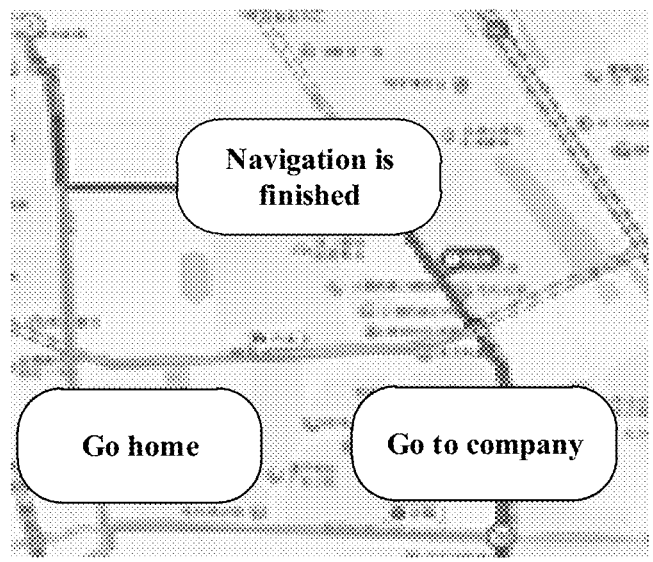
FIG. 13 is still another schematic diagram of a display region corresponding to a display layout manner according to an embodiment of this application.

FIG. 13 is still another schematic diagram of a display region corresponding to a display layout manner according to an embodiment of this application. FIG. 13 shows an application used for navigation. In this example, an operation control of the application includes two touch buttons: a touch button "go home" and a touch button "go to company". The touch button "go home" provides a shortcut operation entry for quickly switching the navigation application to the foreground for running and directly performing a home navigation operation.

An operation control of an application is displayed in a display region corresponding to a display layout manner, so that a shortcut operation entry is provided for a user to quickly switch between applications that are running in the foreground and execute a task corresponding to the operation control, operation operations are simplified for the user, application switching efficiency is improved, and user experience is improved.

In an embodiment, the display control method provided in an embodiment may further include:

displaying, in response to an operation of the user on the operation control, a running interface of the application in full screen on the display interface of the terminal device, where the running interface is an interface displayed when the application executes a task corresponding to the operation control.

The operation performed by the user on the operation control is not limited in an embodiment.

In an embodiment, the related information of the application may include information about the operation control.

It should be noted that the foregoing embodiments may be combined with each other, and a combination manner is not limited in an embodiment of this application.

Based on the display control methods provided in the foregoing embodiments, the following describes a display interface of a terminal device by using examples.

Figure 14:
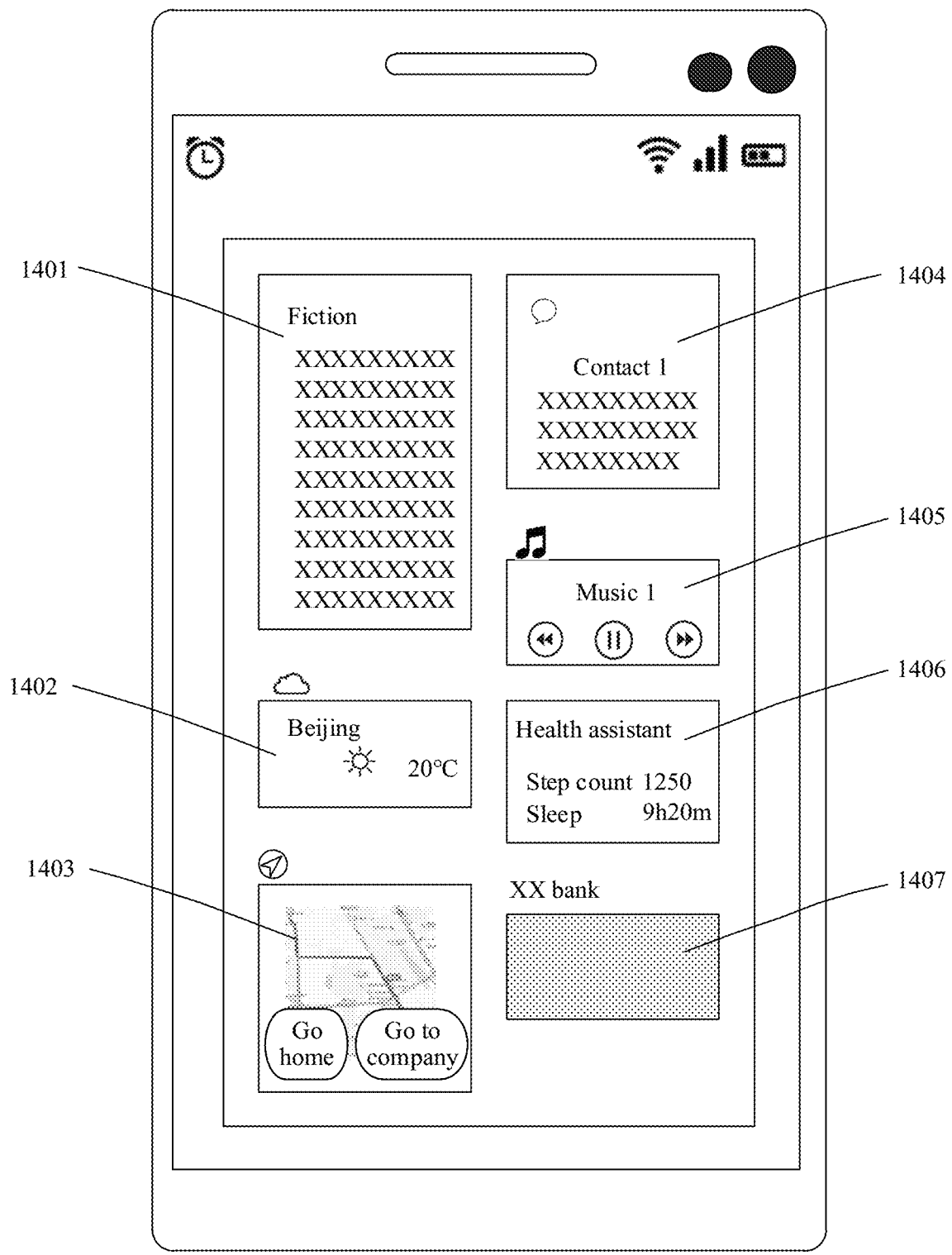
FIG. 14 is still another schematic diagram of a display interface of a terminal device according to an embodiment of this application.

In an embodiment, in an example, FIG. 14 is still another schematic diagram of a display interface of a terminal device according to an embodiment of this application. As shown in FIG. 14, the display interface of the terminal device includes a total of seven display regions corresponding to three display layout manners. Seven applications are running on the terminal device, and the applications are respectively an application 1401 to an application 1407. A display layout manner of the application 1401 may be a display layout manner 1, a display layout manner of the applications 1402, 1405, 1406, and 1407 may be a display layout manner 2, and a display layout manner of the applications 1403 and 1404 may be a display layout manner 2. Key information in display content of the application 1402 includes Beijing, Sunny, and 20° C. An interface of the application 1403 includes two operation controls: a touch button "go home" and a touch button "go to company". An interface of the application 1405 includes three operation controls, and tasks respectively corresponding to the three operation controls from left to right are playing a previous song, pausing, and playing a next song. Key information in display content of the application 1406 includes: an operation count of 1250 operations, and a sleep time of 9 hours and 20 minutes. An interface of the application 1407 is displayed fuzzily, and includes privacy information.

Figure 15:
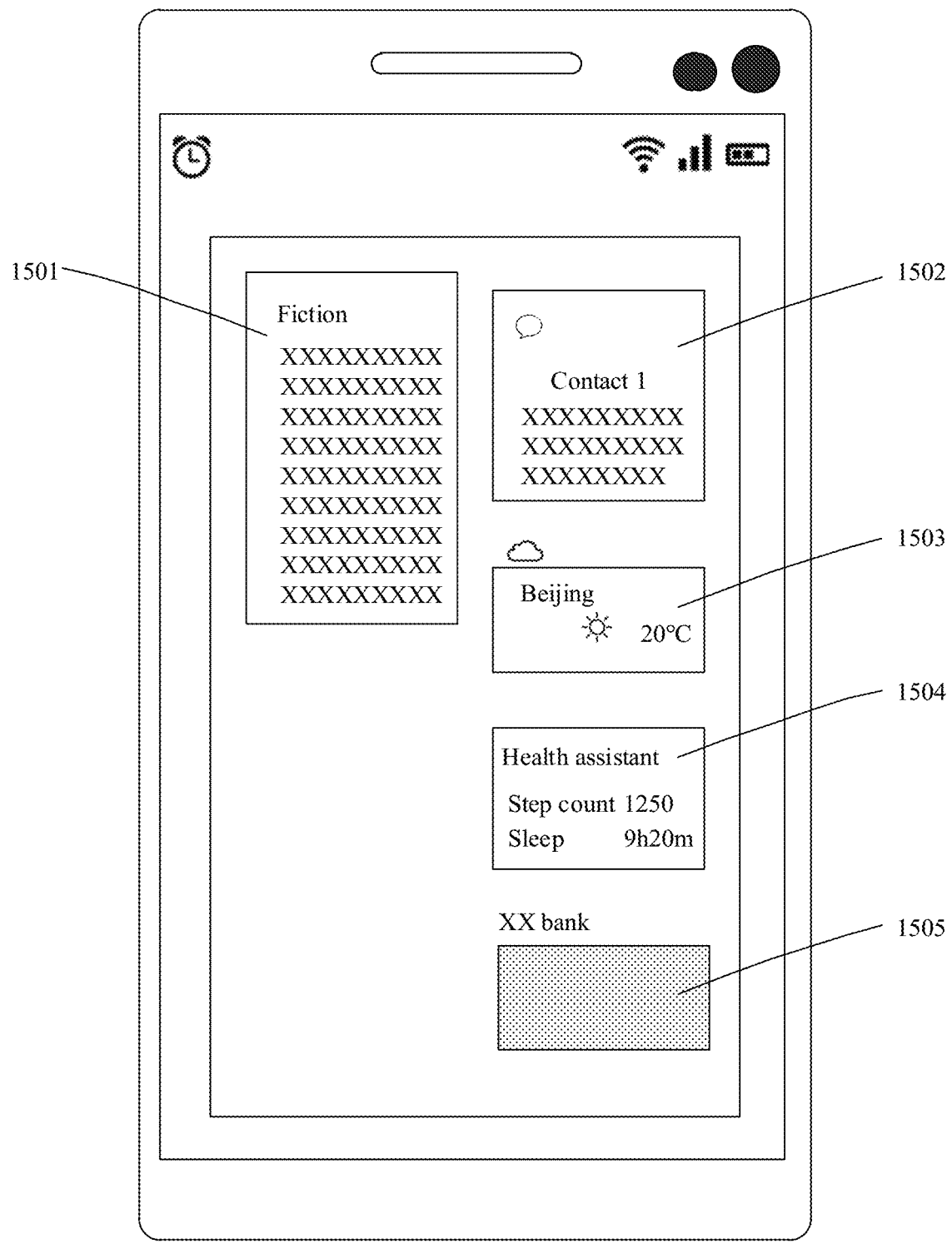
FIG. 15 is still another schematic diagram of a display interface of a terminal device according to an embodiment of this application.

In an embodiment, in another example, FIG. 15 is still another schematic diagram of a display interface of a terminal device according to an embodiment of this application. As shown in FIG. 15, the display interface of the terminal device includes a total of seven display regions corresponding to three display layout manners. A template of the display interface is the same as that in FIG. 15, and an unoccupied display region is not displayed on the display interface of the terminal device. Five applications are running on the terminal device, and the applications are respectively an application 1501 to an application 1505. A display layout manner of the application 1501 may be a display layout manner 1, a display layout manner of the application 1502 may be a display layout manner 2, and a display layout manner of the applications 1503 and 1504 may be a display layout manner 3. For related descriptions for the interface of the application, refer to FIG. 14. Principles are similar, and details are not described herein again.

Figure 16:
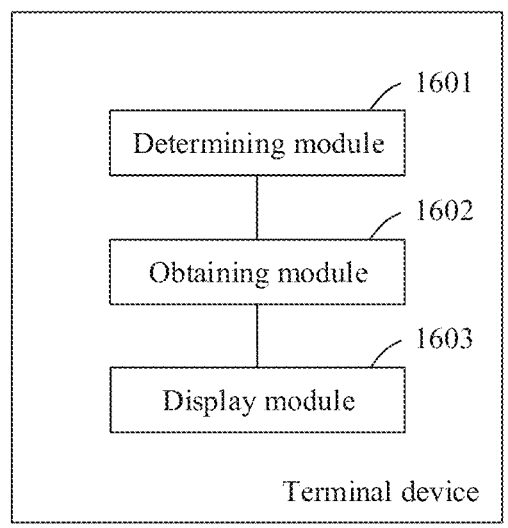
FIG. 16 is a schematic diagram of a structure of a terminal device according to an embodiment of this application.

FIG. 16 is a schematic diagram of a structure of a terminal device according to an embodiment of this application. As shown in FIG. 16, the terminal device provided in an embodiment may include:

a determining module 1601, configured to: in response to a first operation of a user, determine an application that is running on the terminal device, where the first operation is used to trigger display of an interface of the application that is running on the terminal device;

an obtaining module 1602, configured to obtain a display layout manner of the application; and a display module 1603, configured to display the interface of the application in a display region corresponding to the display layout manner, where a display interface of the terminal device includes display regions respectively corresponding to N display layout manners, and N is an integer greater than or equal to 2.

In an embodiment, the obtaining module 1602 is further configured to obtain related information of the application; and the obtaining module 1602 is configured to obtain the display layout manner of the application based on the related information of the application.

In an embodiment, the related information of the application includes one or more of the following: a name of the application, display content or display indication information that is of the application, where the display indication information is used to indicate the display layout manner of the application.

In an embodiment, the display layout manner of the application is related to a display ratio of the display content of the application, where the display ratio of the display content is a proportion of the display content to the interface of the application when the interface of the application is displayed in full screen on the display interface of the terminal device.

In an embodiment, if the display ratio of the display content of the application is greater than a preset proportion, the display layout manner of the application is a display layout manner that has a largest display region.

In an embodiment, the display layout manner of the application is related to a data volume of key information in the display content of the application.

In an embodiment, the display module 1603 is configured to:

display, in the display region corresponding to the display layout manner, the key information in the display content of the application.

In an embodiment, the display content of the application includes privacy information, and the display module 1603 is configured to:

fuzzily display the interface of the application in the display region corresponding to the display layout manner.

In an embodiment, the display module 1603 is configured to:

display the interface of the application and an operation control of the application in the display region corresponding to the display layout manner.

In an embodiment, the display module 1603 is further configured to:

display, in response to an operation of the user on the operation control, a running interface of the application in full screen on the display interface of the terminal device, where the running interface is an interface displayed when the application executes a task corresponding to the operation control.

In an embodiment, the related information of the application includes information about the operation control.

In an embodiment, areas of display regions respectively corresponding to at least two display layout manners in the N display layout manners are different.

The terminal device provided in an embodiment may perform the display control method provided in the method embodiment of this application. Technical principles and technical effects are similar, and details are not described herein again.

Figure 17:
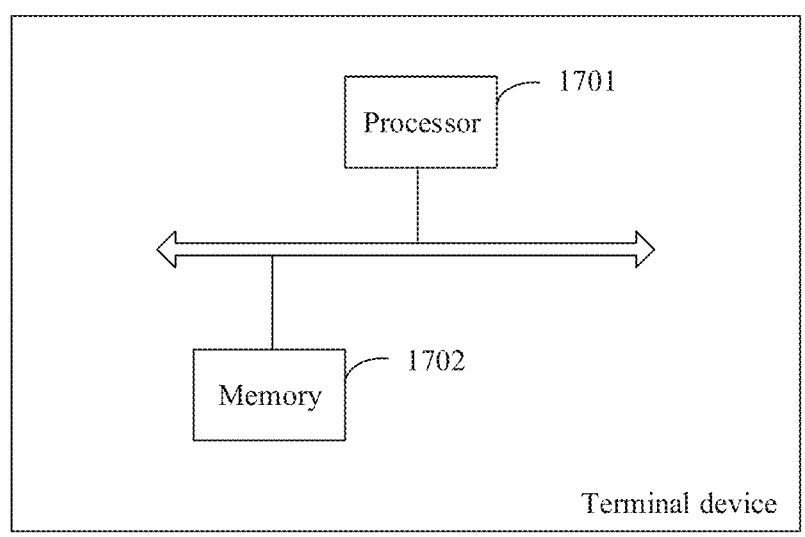
FIG. 17 is another schematic diagram of a structure of a terminal device according to an embodiment of this application.

FIG. 17 is another schematic diagram of a structure of a terminal device according to an embodiment of this application. As shown in FIG. 17, the terminal device provided in an embodiment may include a processor 1701 and a memory 1702. The memory 1702 is configured to store instructions, and the processor 1701 is configured to execute the instructions stored in the memory 1702, to perform the display control method provided in the method embodiment of this application. Technical principles and technical effects are similar, and details are not described herein again.

Figure 18:
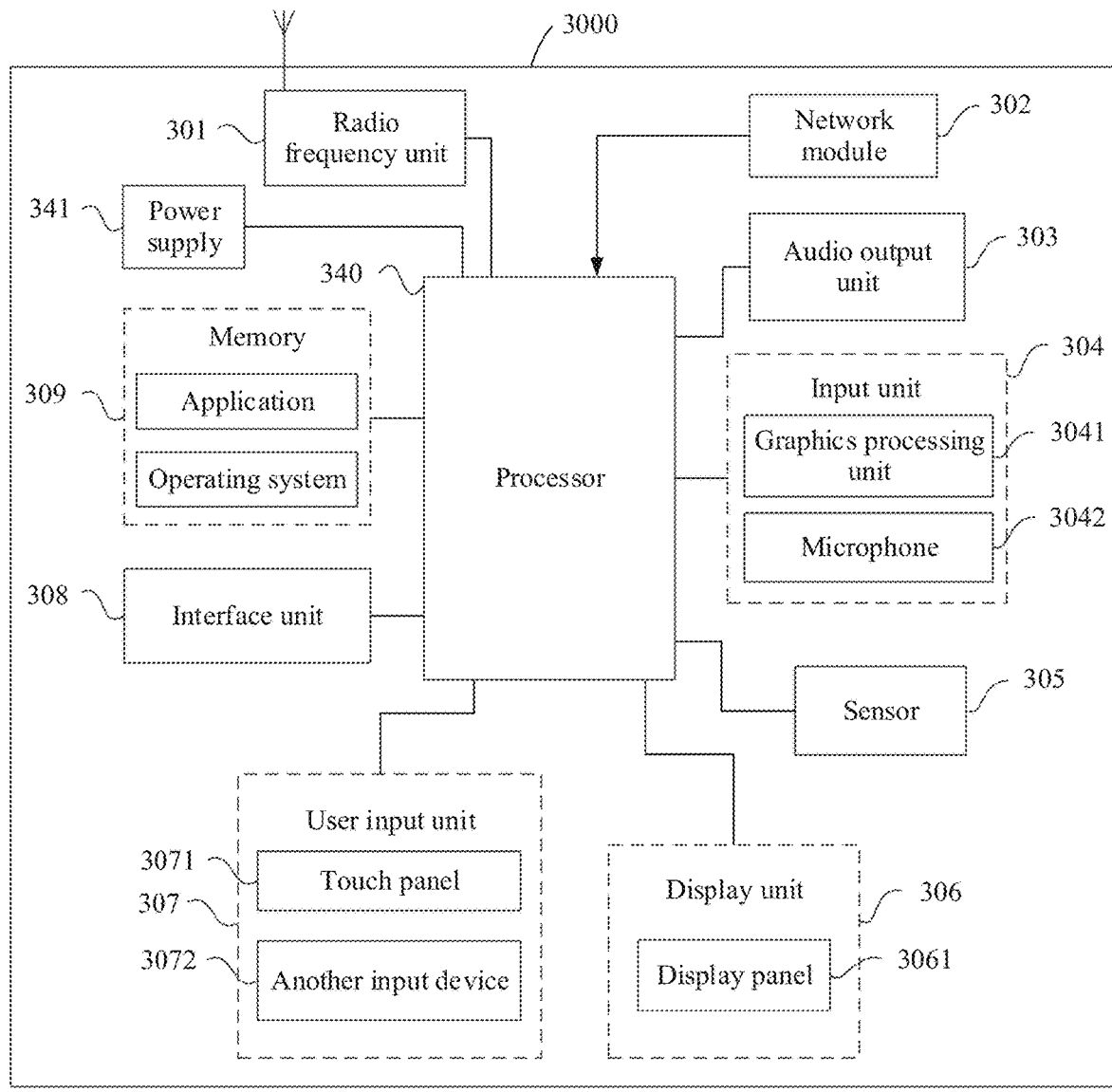
FIG. 18 is a structural diagram of hardware of a terminal device according to an embodiment of this application.

FIG. 18 is a structural diagram of hardware of a device according to an embodiment of this application. The device may be a terminal device. As shown in FIG. 18, a terminal device 3000 includes but is not limited to components such as a radio frequency unit 301, a network module 302, an audio output unit 303, an input unit 304, a sensor 305, a display unit 306, a user input unit 307, an interface unit 308, a memory 309, a processor 340, and a power supply 341. One of ordinary skilled in the art may understand that a structure of the terminal device shown in FIG. 18 constitutes no limitation on the terminal device, and the terminal device 3000 may include more or fewer components than those shown in the figure, or combine some components, or have different component arrangements. In an embodiment of the application, the terminal device includes but is not limited to a mobile phone, a tablet computer, a palmtop computer, and the like.

The user input unit 307 is configured to receive a user input. The display unit 306 is configured to: in response to the input received by the user input unit 307, display content based on the input.

It should be understood that, in an embodiment of the application, the radio frequency unit 301 may be configured to receive and send information, or receive and send a signal in a call process. Generally, the radio frequency unit 301 includes but is not limited to an antenna, at least one amplifier, a transceiver, a coupler, a low noise amplifier, a duplexer, and the like. In addition, the radio frequency unit 301 may further communicate with a network and another device by using a wireless communication system.

The terminal device 3000 provides wireless broadband Internet access for a user by using the network module 302, for example, helping the user receive and send an email, browse a web page, and access streaming media.

The audio output unit 303 may convert audio data that is received by the radio frequency unit 301 or the network module 302 or that is stored in the memory 309 into an audio signal, and output the audio signal as sound. In addition, the audio output unit 303 may further provide audio output (for example, a call signal receiving sound or a message receiving sound) related to a specified function performed by the terminal device 3000. The audio output unit 303 includes a speaker, a buzzer, a receiver, and the like.

The input unit 304 is configured to receive an audio signal or a video signal. The input unit 304 may include a graphics processing unit (GPU) 3043 and a microphone 3042. The graphics processing unit 3043 is configured to process image data of a picture or a video that is captured by a camera or the like. A processed image frame may be displayed on the display unit 306. The image frame processed by the graphics processing unit 3043 may be stored in the memory 309 (or another storage medium), or may be sent by using the radio frequency unit 301 or the network module 302. The microphone 3042 may receive sound, and can process such sound into audio data. The processed audio data may be converted, in a case of a telephone call mode, into a format that can be sent to a mobile communication base station by using the radio frequency unit 301, to output.

The terminal device 3000 further includes at least one sensor 305, such as a light sensor, a motion sensor, and another sensor. In an embodiment, the light sensor includes an ambient light sensor and a proximity sensor. The ambient light sensor may adjust brightness of a display panel 3063 based on brightness of ambient light. The proximity sensor may turn off the display panel 3063 and/or backlight when the terminal device 3000 moves to an ear. As a type of motion sensor, an accelerometer sensor may detect magnitude of acceleration in each direction (generally three axes), and may detect magnitude and a direction that are of gravity when the terminal device is still, and may be used to identify a posture of the terminal device (for example, landscape/portrait switching, a related game, and magnetometer posture calibration), a function related to vibration identification (for example, a pedometer or a tap), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein again.

The display unit 306 is configured to display information that is input by the user or information that is provided for the user. The display unit 306 may include the display panel 3063, and the display panel 3063 may be configured in a form of a liquid crystal display (LCD), an organic light-emitting diode (OLED), or the like.

The user input unit 307 may be configured to receive input digit or character information, and generate key signal input related to user setting and function control that are of the terminal device. In an embodiment, the user input unit 307 includes a touch panel 3073 and another input device 3072. The touch panel 3073, also referred to as a touchscreen, may collect a touch operation (for example, an operation performed by the user on or near the touch panel 3073 by using any proper object or accessory such as a finger or a stylus pen) performed by the user on or near the touch panel 3073. The touch panel 3073 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, sends the touch point coordinates to the processor 340, and receives and executes a command sent by the processor 340. In addition, the touch panel 3073 may be implemented in a plurality of types such as a resistive type, a capacitive type, an infrared type, and a surface acoustic wave type. In addition to the touch panel 3073, the user input unit 307 may further include the another input device 3072. In an embodiment, the another input device 3072 may include but is not limited to a physical keyboard, a function button (such as a volume control button or an on/off button), a trackball, a mouse, and a joystick. Details are not described herein again.

Further, the touch panel 3073 may cover the display panel 3063. After detecting the touch operation on or near the touch panel 3073, the touch panel 3073 transmits the touch operation to the processor 340 to determine a type of a touch event, and then, the processor 340 provides corresponding visual output on the display panel 3063 based on the type of the touch event. Although in FIG. 18, the touch panel 3073 and the display panel 3063 are used as two independent components to implement input and output functions of the terminal device, in some embodiments, the touch panel 3073 and the display panel 3063 may be integrated to implement input and output functions of the terminal device. This is not limited herein.

The interface unit 308 is an interface for connecting an external apparatus and the terminal device 3000. For example, the external apparatus may include a wired or wireless headset port, an external power supply (or battery charger) port, a wired or wireless data port, a memory card port, a port for connecting to an apparatus that has an identification module, an audio input/output (I/O) port, a video I/O port, a headset port, and the like. The interface unit 308 may be configured to receive input (for example, data information or power) from the external apparatus and transmit the received input to one or more elements in the terminal device 3000, or may be configured to transmit data between the terminal device 3000 and the external apparatus.

The memory 309 may be configured to store a software program and various data. The memory 309 may mainly include a program storage area and a data storage area. The program storage area may store an operating system, an application required by at least one function (such as a sound playback function and an image playback function), and the like. The data storage area may store data (such as audio data and a phone book) created based on use of a mobile phone, and the like. In addition, the memory 309 may include a high speed random access memory, and may further include a nonvolatile memory, for example, at least one magnetic disk storage device, a flash memory device, or another volatile solid-state storage device.

The processor 340 is a control center of the terminal device, is connected to all parts of the entire terminal device by using various interfaces and lines, and performs various functions of the terminal device and data processing by running or executing a software program stored in the memory 309 and/or a module stored in the memory 309 and invoking data stored in the memory 309. In this way, overall monitoring is performed on the terminal device. The processor 340 may include one or more processing units. In an embodiment, an application processor and a modem processor may be integrated into the processor 340. The application processor mainly processes an operating system, a user interface, an application, and the like. The modem processor mainly processes wireless communication. It may be understood that the modem processor may not be integrated into the processor 340.

Refer to FIG. 18. In an embodiment of the application, the memory 309 stores a computer program, and the processor 340 runs the computer program, so that the terminal device performs the operation performed by the first device in the foregoing method embodiment.

In an embodiment of the application, the processor may be a general purpose processor, a digital signal processor, an application-specific integrated circuit, a field programmable gate array or another programmable logic device, a discrete gate or a transistor logic device, or a discrete hardware component, so that the methods, operations, and logical block diagrams that are disclosed in embodiments of this application may be implemented or performed. The general purpose processor may be a microprocessor, any conventional processor, or the like. The operations of the methods disclosed with reference to embodiments of this application may be directly performed and completed by a hardware processor, or may be performed and completed by using a combination of hardware and software modules that are in a processor.

In an embodiment of the application, the memory may be a nonvolatile memory, for example, a hard disk drive (HDD) or a solid-state drive (solid-state drive, SSD), or may be a volatile memory, for example, a random-access memory (RAM). The memory is any other medium that can be configured to carry or store expected program code in a form of an instruction or a data structure and that can be accessed by a computer, but is not limited thereto. The memory in an embodiment of the application may further be a circuit or any other apparatus that can implement a storage function, and is configured to store a program instruction and/or data.

What is claimed is:

1. A terminal device, comprising:
   a processor,
   a memory coupled with the processor to store instructions, which when executed by the processor, cause the terminal device to perform operations, the operations comprising:
   determining, in response to a first operation of a user, an application running on the terminal device, wherein the first operation is used to trigger the terminal device to display a multi-task interface of a plurality applications running on the terminal device, for the user to view the plurality applications running on the terminal device, and to switch an application running in a foreground;
   obtaining a display layout manner of the application; and
   displaying the multi-task interface, wherein the multi-task interface of the terminal device comprises multiple display regions respectively corresponding to N display layout manners, wherein areas of display regions respectively corresponding to at least two display layout manners in the N display layout manners are different, and an interface of the application which satisfies the display layout manner of the application is displayed in a display region, among the multiple display regions, corresponding to the display layout manner of the application.

2. The terminal device according to claim 1, wherein operations further comprise:
   obtaining related information of the application, wherein the obtaining the display layout manner of the application comprises:
   obtaining the display layout manner of the application based on the related information of the application.

3. The terminal device according to claim 2, wherein the related information of the application comprises one or more of: a name of the application, display content, or display indication information of the application, wherein the display indication information is used to indicate the display layout manner of the application.

4. The terminal device according to claim 3, wherein the display layout manner of the application is related to a display ratio of the display content of the application, wherein
   the display ratio of the display content is a proportion of the display content to the interface of the application when the interface of the application is displayed in full screen on a display interface of the terminal device.

5. The terminal device according to claim 4, wherein if the display ratio of the display content of the application is greater than a preset proportion, the display layout manner of the application is a display layout manner with a largest display region.

6. The terminal device according to claim 3, wherein the display layout manner of the application is related to a data volume of key information in the display content of the application.

7. The terminal device according to claim 6, wherein the operations further comprise:
displaying, in the display region corresponding to the display layout manner, the key information in the display content of the application.

8. The terminal device according to claim 3, wherein the display content of the application comprises privacy information, and the displaying the interface of the application in the display region corresponding to the display layout manner comprises:
fuzzily displaying the interface of the application in the display region corresponding to the display layout manner.

9. The terminal device according to claim 3, wherein the operations further comprise:
displaying the interface of the application and an operation control of the application in the display region corresponding to the display layout manner.

10. The terminal device according to claim 9, wherein the operations further comprise:
displaying, in response to an operation of the user on the operation control, a running interface of the application in full screen on a display interface of the terminal device, wherein the running interface is displayed when the application executes a task corresponding to the operation control.

11. The terminal device according to claim 10, wherein the related information of the application comprises information about the operation control.

12. A display control method, applied to a terminal device, comprising:
determining, in response to a first operation of a user, an application running on the terminal device, wherein the first operation is used to trigger the terminal device to display a multi-task interface of a plurality applications running on the terminal device, for the user to view the plurality applications running on the terminal device, and to switch an application running in a foreground;
obtaining a display layout manner of the application; and
displaying the multi-task interface, wherein
the multi-task interface of the terminal device comprises multiple display regions respectively corresponding to N display layout manners, wherein areas of display regions respectively corresponding to at least two display layout manners in the N display layout manners are different, and an interface of the application which satisfies the display layout manner of the application is displayed in a display region, among the multiple display regions, corresponding to the display layout manner of the application.

13. The method according to claim 12, further comprising:
obtaining related information of the application, wherein the obtaining a display layout manner of the application comprises:
obtaining the display layout manner of the application based on the related information of the application.

14. The method according to claim 13, wherein the related information of the application comprises one or more of: a name of the application, display content, or display indication information of the application, wherein the display indication information is used to indicate the display layout manner of the application.

15. The method according to claim 14, wherein the display layout manner of the application is related to a display ratio of the display content of the application, wherein
the display ratio of the display content is a proportion of the display content to the interface of the application when the interface of the application is displayed in full screen on a display interface of the terminal device.

16. The method according to claim 15, wherein if the display ratio of the display content of the application is greater than a preset proportion, the display layout manner of the application is a display layout manner with a largest display region.

17. The method according to claim 14, wherein the display layout manner of the application is related to a data volume of key information in the display content of the application.

18. The method according to claim 17, wherein the displaying the interface of the application in the display region corresponding to the display layout manner comprises:
displaying, in the display region corresponding to the display layout manner, the key information in the display content of the application.

19. The method according to claim 14, wherein the display content of the application comprises privacy information, and the displaying the interface of the application in the display region corresponding to the display layout manner comprises:
fuzzily displaying the interface of the application in the display region corresponding to the display layout manner.

20. The method according to claim 14, wherein the displaying the interface of the application in the display region corresponding to the display layout manner comprises:
displaying the interface of the application and an operation control of the application in the display region corresponding to the display layout manner.

* * * * *